United States Patent Office 2,757,200
Patented July 31, 1956

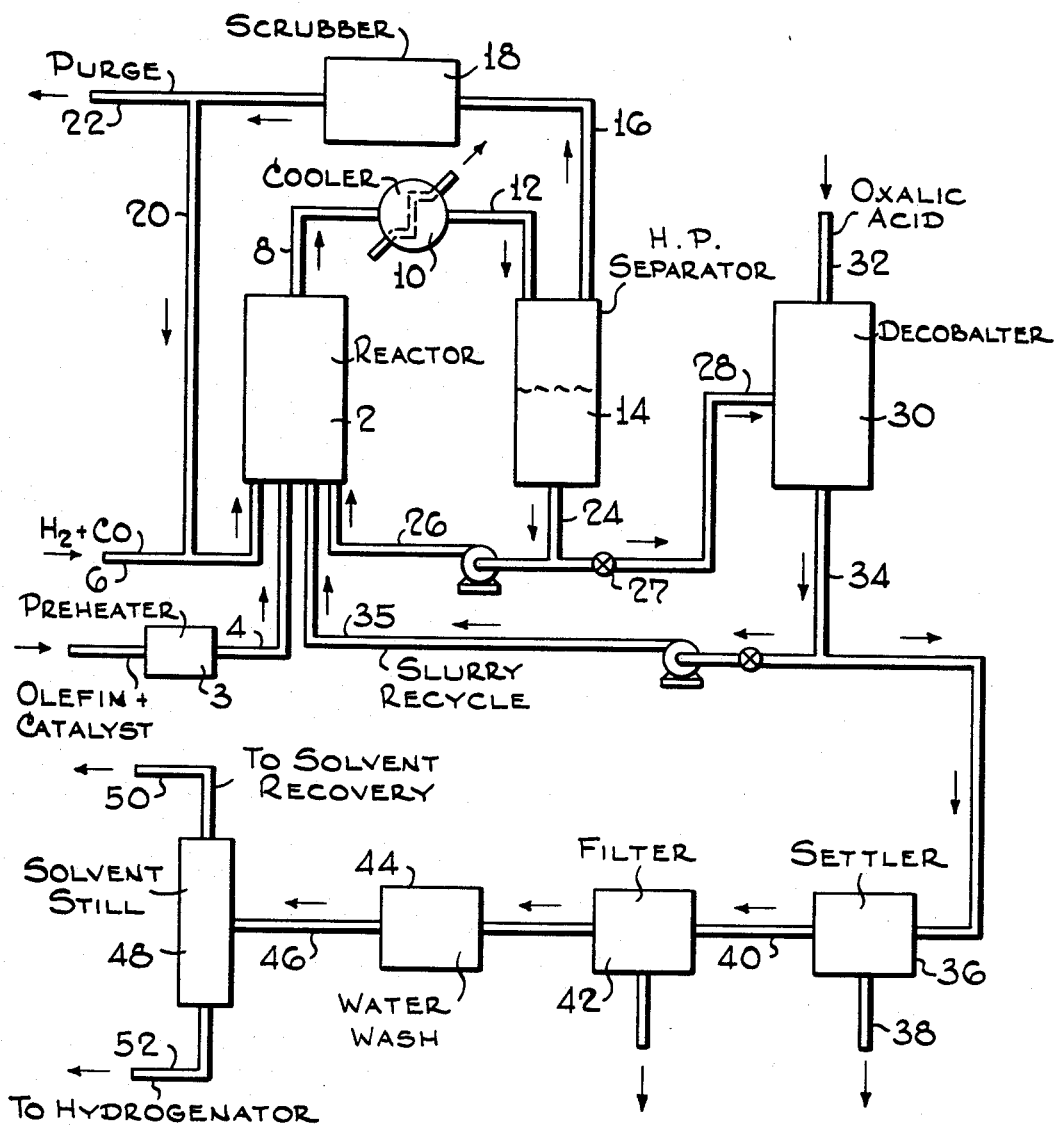

2,757,200

DECOBALTING OF OXO ALDEHYDES WITH NONAQUEOUS OXALIC ACID

Thomas G. Jones, Mack C. Fuqua, and Charles M. Downs, Jr., Baton Rouge, La., assignors to Esso Research and Engineering Company, a corporation of Delaware Application March 29, 1951, Serial No. 218,192

10 Claims. (Cl. 260—604)

The present invention relates to the preparation of organic compounds by the reaction of carbon monoxide and hydrogen with carbon compounds containing olefinic linkages in the presence of a carbonylation catalyst. More specifically, the present invention relates to the recovery of the cobalt catalyst utilized in the foregoing reaction from the product of the first stage of the cobalt carbonylation reaction for further use in the process.

It is now well known in the art that oxygenated organic compounds may be synthesized from organic compounds containing olefinic linkages by a reaction with carbon monoxide and hydrogen in the presence of a catalyst containing metals of the iron group, such as cobalt or iron, preferably the former, in an essentially three-stage process. In the first stage, the olefinic material, catalyst and the proper proportions of CO and $H_2$ are reacted to give a product consisting predominantly of aldehydes containing one more carbon atom than the reacted olefin. This oxygenated organic mixture, which contains dissolved in it salts and the carbonyls and molecular complexes of the metal catalyst, is treated in a second stage to cause removal of soluble metal compounds from the organic material in a catalyst removal zone. The catalyst-free material is then generally hydrogenated to the corresponding alcohols, or may be oxidized to the corresponding acid.

This carbonylation reaction provides a particularly attractive method for preparing valuable primary alcohols which find large markets, particularly as intermediates for plasticizers, detergents and solvents. Amenable to the reaction are long and short chained olefinic compounds, depending upon the type alcohols desired. Not only olefins, but most organic compounds possessing at least one non-aromatic carbon-carbon double bond may be reacted by this method. Thus, straight and branch-chained olefins and diolefins such as propylene, butylene, pentene, hexene, heptene, butadiene, pentadiene, styrene, olefin polymers such as di- and tri-isobutylene and hexene and heptene dimers, polypropylene, olefinic fractions from the hydrocarbon synthesis process, thermal or catalytic cracking operations, and other sources of hydrocarbon fractions containing olefins may be used as starting material, depending upon the nature of the final product desired.

The catalyst in the first stage of the prior art processes is usually added in the form of salts of the catalytically active metal with high molecular fatty acids, such as stearic, oleic, palmitic, naphthenic, etc., acids. Thus, suitable catalysts are, for example, cobalt oleate or naphthenate, or iron linoleate. These salts are soluble in the liquid olefin feed and may be supplied to the first stage as hydrocarbon solution or dissolved in the olefin feed.

The synthesis gas mixture fed to the first stage may consist of any ratio of $H_2$ to CO, but preferably these gases are present in about equal volumes. The conditions for reacting olefins with $H_2$ and CO vary somewhat in accordance with the nature of the olefin feed, but the reaction is generally conducted at pressures in the range of about 1500 to 4500 p. s. i. g. and at temperatures in the range of about 150–450° F. The ratio of synthesis gas to olefin feed may vary widely; in general, about 2500 to 15,000 cubic feet of $H_2+CO$ per barrel of olefin feed are employed.

At the end of the first stage, when the desired conversion of olefins to oxygenated compounds has been effected, the product and the unreacted material are generally withdrawn to a catalyst removal zone, where dissolved catalyst is removed from the mixture and it is to this stage that the present principal invention applies.

From the catalyst removal zone the reaction products, comprising essentially aldehydes, may be transferred to a hydrogenation zone, and the products reduced to the corresponding alcohols in a manner known per se.

One of the problems involved in the aldehyde synthesis reaction is the fact that the catalyst metal, such as cobalt, though added as an organic salt, reacts with carbon monoxide under the synthesis conditions to form the metal carbonyl. There is basis for the belief that the metal carbonyl itself is the active form of the catalyst. This dissolved catalyst must be removed prior to the subsequent hydrogenation, as otherwise it would separate out on the hydrogenation catalyst, plug transfer lines and heat exchangers, etc. The carbonyl remains dissolved in the reaction product from the primary carbonylation stage and is therefore removed in the catalyst removal, or decobalting zone. In the past, catalyst removal has been accomplished by heating the primary reaction product in a tower which may be packed with catalytically inert material and which may be under elevated pressures, in the presence of an inert vapor, such as hydrogen to maintain the CO partial pressures low as possible, thereby decomposing the metal carbonyl and precipitating the metal on the packing and the walls of the vessel, as well as on other surfaces therein. The carbon monoxide formed was purged with hydrogen to protect the nickel or cobalt catalyst usually employed in the subsequent hydrogenation stage. Such process, however, required periodic interruption in order to remove accumulated metallic cobalt from the packing to prevent plugging up feed inlet lines and adjacent areas of the decobalting vessel. Furthermore, cobalt metal deposited as a film on the heating means and required constant removal to prevent the plugging up of the preheating equipment and surfaces. The removal of these films and deposited cobalt metal was a tedious and difficult process and added significant costs to the economics of the carbonylation reaction.

An additional drawback associated with the prior art decobalting processes is the fact that high temperatures are required therein, usually in the range of 250–450° F. Aldehydes, however, are extremely temperature sensitive compounds, which in the presence of heat tend to undergo secondary reactions, such as aldol formation, dehydration polymerization, Cannizzaro reactions, etc., particularly when catalyzed as finely divided metal, which is usually formed in significant amounts during thermal decobalting.

It is, therefore, the principal purpose of the present invention to provide an improved and novel means of removing dissolved carbonylation catalyst from conversion products resulting from reaction of olefinic compounds with CO and $H_2$.

Another object of the present invention is to remove dissolved cobalt carbonyl from the aldehyde synthesis reaction product without subjecting the same to any substantial thermal treatment and without causing the same to form undesirable secondary reaction products.

A still further object of the present invention is to remove the cobalt catalyst from the aldehyde product and to provide a particularly advantageous means for reutilizing the same in the process.

Other objects and advantages of the invention will become apparent from the description hereinafter.

It has now been found that oxalic acid, either added as a solid or dissolved in a non-aqueous solvent, has exceptional properties of combining and reacting with the cobalt compounds and complexes dissolved in the aldehyde synthesis reaction products and precipitating out of solution, substantially in the absence of added heat. A particularly advantageous means of adding the reagent is to dissolve it in a non-aqueous solvent, such as diethyl ether, acetone, dioxane, etc., which may be readily removed from the alcohol subsequently produced from the aldehyde by hydrogenation. By means of adding the non-aqueous solution of the acid, intimate contact between the latter and the aldehyde to be decobalted is obtained because of the homogeneous condition of the solution. Almost immediately cobalt oxalate begins to precipitate, and an aldehyde product requiring only a filtration or water washing to be completely free of cobalt is obtained. It is essential to remove practically completely dissolved cobalt from the aldehyde solution prior to hydrogenation to prevent plugging of reactors and fouling of the catalyst.

The present invention and its application will best be understood from the more detailed description hereinafter, wherein reference will be made to the accompanying drawing, which is a schematic illustration of a system suitable for carrying out a preferred embodiment of the invention.

Referring now to the diagram, an olefinic hydrocarbon having one carbon atom less than the number of carbon atoms in the desired resulting aldehyde or alcohol is fed through preheater 3 and line 4 to the bottom portion of primary reactor 2. The latter comprises a reaction vessel which may, if desired, be packed with non-catalytic material such as Raschig rings, pumice, porcelain chips, and the like. Reactor 2 may be divided into discrete zones or may comprise but a single reaction zone.

The olefinic feed, when starting up operation, may contain dissolved therein 1 to 3% by weight of cobalt naphthenate, oleate, etc., based on olefin. Other soluble compounds of cobalt may also be used, or concentrated catalyst solutions may be fed as a separate stream. However, if desired, oil-insoluble forms of cobalt may be employed. Cobalt oxalate is particularly advantageous, inasmuch as the acid formed therefrom within the reactor is non-corrosive and is readily separated from the reaction products. As the run proceeds, in one embodiment of the present invention, dissolved cobalt is gradually cut back and a cobalt oxalate slurry in aldehyde is passed into reactor 2, as disclosed more fully below.

A gas mixture comprising $H_2$ and $CO$ in approximate ratio of 0.5–2 volumes of $H_2$ per volume $CO$ is supplied through line 6 and flows concurrently through reactor 2 with liquid olefin feed and dissolved or dispersed catalyst. Reactor 2 is preferably operated at a pressure of about 2500–3500 p. s. i. g., and at a temperature of about 250–450° F., depending upon the olefin feed and other reaction conditions. As a result of the reaction between cobalt and synthesis gases, cobalt carbonyls are formed, and it is commonly believed to be the hydrocarbonyl which catalyzes the conversion of olefins to aldehydes. The rates of flow of olefin, catalyst and synthesis gases through reactor 2 are so regulated and the temperatures so maintained that the desired conversion level of the olefins is obtained.

Liquid oxygenated reaction products, containing cobalt carbonyl and other forms of cobalt to the extent of 1800 to 2000 parts per million in solution, and unreacted synthesis gases are withdrawn overhead from an upper portion of high pressure reactor 2 and are transferred through line 8 to cooler 10 in which any conventional means of cooling are employed, and from thence via line 12 to high pressure separator 14 where unreacted gases are withdrawn overhead through line 16, scrubbed in scrubber 18 of entrained liquid and cobalt carbonyl, and used in any way desired. They may be recycled to synthesis gas feed line 6 via line 20, or purged through line 22.

A stream of primary reaction product containing dissolved therein relatively high concentrations of cobalt carbonyl is withdrawn from separator 14 through line 24. A portion of said withdrawn stream may be recycled, if desired, to reactor 2 via line 26 and injected at suitable points in the reaction zone to provide cooling and maintenance of temperature control of the primary carbonylation stage. The balance of the primary reaction product is withdrawn through pressure release valve 27 and is passed through line 28 to catalyst removal, or decobalting zone 30.

In the embodiment of the invention wherein the oxalic acid reagent is added as a solution in a non-aqueous medium, it is desirable to add a molar excess of oxalic acid to the aldehyde product. Thus a solution of oxalic acid in diethyl ether may be passed into decobalter 30 through line 32. Analysis of the cobalt in the aldehyde product determines the amount of acid to be added. Generally, a 10% excess is adequate. The temperature within 30 is maintained in the range of about 70 to 160° F., preferably about 130 to 150° F. Higher temperatures are not required nor desired. Precipitation proceeds rapidly and, if desired, suitable means of agitation (not shown) may also be employed. The mixture of aldehyde, solvent, and cobalt oxalate is then passed through line 34 to settler 36, wherein the precipitate separates from the aldehyde-solvent layer and sinks to the bottom of 36, from which it may be withdrawn through line 38 and reused in the reaction, either directly by injection into reactor 2 or after conversion into an oil-soluble soap.

Because of the fine-sized form of the cobalt oxalate particles, a portion of the suspension prior to settling may be advantageously recycled to reactor 2 via line 35. The fine particle size and stability of the suspension make it readily pumpable with diminished tendencies to erode high pressure equipment.

The clear supernatant aldehyde-solvent mixture may, if desired, be passed from settler 36 through line 40 to filter 42 for removal of any remaining suspended cobalt particles. Also, if desired, the product may be given a water washing in washing equipment 44 to insure the substantially complete absence of soluble cobalt compounds. In general, however, it is not necessary to include both a filtration and a water washing step. The cobalt-free product may then be passed through line 46 to flash still 48 wherein low boiling solvents added in 30 are removed from the aldehyde product. These flash distillations are operated at relatively low temperatures; for instance about 95° F. when ether is the solvent. It may sometimes be preferred to separate the solvent after the aldehyde hydrogenation step. This is indicated when the aldehyde and solvent are not too dissimilar in boiling range, and when the solvent is not susceptible to hydrogenation. The solvent is withdrawn overhead from flash still 48 via line 50 and sent to the solvent recovery system for reuse in the process. The aldehyde product is withdrawn through line 52 and passed to the hydrogenation stage, wherein it is converted into alcohol in a manner known per se.

The process of the invention admits of numerous modifications apparent to those skilled in the art. Thus, under certain conditions, it may be advantageous to employ solid crystalline oxalic acid as the decobalting agent. In such case, of course, no solvent separation step is necessary. The acid is added through line 32, vigorously agitated in decobalter 30, and the product passed through line 34 for settling and, if desired, recycle of a portion of the cobalt oxalate slurried in aldehyde to the initial reaction zone. Temperatures within decobalter 30 are preferably, when employing crystalline oxalic acid, about 130 to 150° F. It is preferred to add about molar equivalent amounts of oxalic acid based on the cobalt present in the aldehyde product. Instead of, or in addition to, filtration and water washing, the cobalt oxalate may be separated from the aldehyde product by centrifuging.

The process and advantages of the present invention may be further illustrated by the following specific examples.

*Example I*

A sample of the crude aldehyde product containing 1600 parts per million of cobalt was agitated at 130° F. for 15 minutes with a 10% molar excess of oxalic acid, i. e. 10% more of oxalic acid than that theoretically required to react with all of the cobalt to form cobalt oxalate. The oxalic acid was added as an ethyl ether solution. The mixture was permitted to settle for 30 minutes, and the aldehyde layer, on analysis, was found to contain only 25 parts per million of cobalt. Filtration of the aldehyde layer produced, on analysis, a product completely free of suspended and dissolved cobalt.

Another portion of the clear aldehyde layer was water-washed instead of filtered. It was found that water washing was effective in substantially completely removing the cobalt.

*Example II*

The foregoing procedure in Example I was here repeated, except for the fact that acetone was substituted for the ether as a solvent for the acid. It was here found that the results were the same and that the thus treated aldehyde product was substantially free of cobalt.

*Example III*

A 100 gram sample of aldehyde product containing in solution 1810 parts per million of cobalt was treated with 0.427 g. of crystalline $C_2H_2O_4.2H_2O$ and the mixture allowed to stand. After filtration, the aldehyde contained 31 parts per million of cobalt, and subsequent water washing brought this down to 10 p. p. m.

The advantages of the present invention include, among others, that only a two-phase (solid-liquid) rather than a three-phase (liquid-liquid-solid) system is involved in the decobalting, and that a water-free slurry containing cobalt is obtained.

Numerous modifications of the present invention will be apparent to those who are familiar with the art, without departing from the spirit of the invention. Thus, it may be advantageous to employ a solution of oxalic acid in decobalted aldehyde product as the medium for introducing the acid into the decobalting zone. Likewise, it may also be advantageous to dehydrate the acid prior to use as a decobalting agent, thereby materially increasing its solubility in the organic solvent and aldehyde product, and insuring a homogeneous decobalting phase.

What is claimed is:

1. In the process wherein olefins, carbon monoxide and hydrogen are contacted in a carbonylation zone at elevated temperatures and pressures with a cobalt carbonylation catalyst under conditions to produce aldehydes containing one more carbon atom than said olefins, and wherein said aldehydes containing dissolved therein cobalt compounds including cobalt carbonyl is further treated to remove said cobalt containing materials in a catalyst removal zone, the improvement which comprises treating said aldehyde product containing said cobalt compound in solution with non-aqueous oxalic acid in said catalyst removal zone, recovering cobalt-comprising compounds from said zone and employing at least a portion of said recovered cobalt as catalyst in said carbonylation zone.

2. The process of claim 1 wherein said oxalic acid is added to said catalyst removal zone as a solution in a non-aqueous liquid medium.

3. The process of claim 1 wherein said acid is added to said zone as a crystalline solid.

4. An improved process for removing cobalt from an aldehyde synthesis reaction product obtained by reacting in an aldehyde synthesis reaction zone an olefin with CO and $H_2$ in the presence of a cobalt catalyst which comprises passing said product to a catalyst removal zone, passing to said zone a solution of oxalic acid in a non-aqueous solvent, maintaining a temperature within said zone below about 160° F., forming a precipitate of cobalt oxalate in said zone, passing said precipitate and aldehyde product to a settling zone wherein said cobalt oxalate is permitted to settle, and thereafter removing said cobalt oxalate.

5. The process of claim 4 wherein at least a portion of said cobalt oxalate is recycled as slurry in said aldehyde to said aldehyde synthesis reaction zone.

6. The process of claim 4 wherein said solvent is an ether.

7. The process of claim 4 wherein said solvent is acetone.

8. The process of claim 4 wherein at least a portion of said cobalt catalyst employed in said aldehyde synthesis reaction zone is cobalt oxalate.

9. The process of claim 4 wherein said solvent is previously decobalted aldehyde product.

10. The process of claim 3 wherein said acid is added to said zone as an anhydrous crystalline solid.

References Cited in the file of this patent

UNITED STATES PATENTS

| | | |
|---|---|---|
| 2,448,368 | Gresham et al. | Aug. 31, 1948 |
| 2,473,993 | Gresham et al. | June 21, 1949 |
| 2,509,878 | Owen | May 30, 1950 |
| 2,564,104 | Gresham et al. | Aug. 14, 1951 |

FOREIGN PATENTS

| | | |
|---|---|---|
| 493,493 | Belgium | Feb. 15, 1950 |
| 496,845 | Belgium | Jan. 8, 1951 |

OTHER REFERENCES

Scholder et al.: Berichte der Deutches Chemisches Gesellschaft, volume 60B, pp. 1510-25 (1927).

I. G. Farben Patent Application I 72948 IVd/12o, translated by C. A. Meyer in pamphlet entitled "Oxo Process," pp. 47-49 (1948).

Wender et al.: Jour. Am. Chem. Soc., vol 72, pp. 4375-8 (October 1950).